United States Patent
Shiratori

(10) Patent No.: US 7,561,372 B2
(45) Date of Patent: Jul. 14, 2009

(54) SYSTEM AND METHOD FOR WRITING DATA TO MAGNETIC TAPE

(75) Inventor: Toshiyuki Shiratori, Komae (JP)

(73) Assignee: International Business Machines Corporation, Armonk, NY (US)

( * ) Notice: Subject to any disclaimer, the term of this patent is extended or adjusted under 35 U.S.C. 154(b) by 153 days.

(21) Appl. No.: 11/469,328

(22) Filed: Aug. 31, 2006

(65) Prior Publication Data
US 2007/0053091 A1 Mar. 8, 2007

(30) Foreign Application Priority Data
Sep. 6, 2005 (JP) ............... 2005-257388

(51) Int. Cl.
G11B 5/584 (2006.01)
(52) U.S. Cl. .................. 360/77.12
(58) Field of Classification Search ............ 360/77.12, 360/48, 69
See application file for complete search history.

(56) References Cited

U.S. PATENT DOCUMENTS

| 6,856,479 | B2 | 2/2005 | Jaquette et al. |
| 6,865,043 | B2 | 3/2005 | Ataku et al. |
| 2004/0230741 | A1 | 11/2004 | Watanabe |
| 2004/0243760 | A1* | 12/2004 | Dahman et al. ............ 711/113 |
| 2005/0041317 | A1* | 2/2005 | Jaquette ...................... 360/46 |
| 2006/0164744 | A1* | 7/2006 | Greco et al. ................. 360/55 |

FOREIGN PATENT DOCUMENTS

| CN | 1584986 A | 2/2005 |
| JP | 56013506 | 9/1981 |
| JP | 57135411 | 8/1982 |
| JP | 61099904 | 5/1986 |
| JP | 61180326 | 8/1986 |
| JP | 01146167 | 8/1989 |
| JP | 03029166 | 7/1991 |
| JP | 04360227 | 12/1992 |
| JP | 05108275 | 4/1993 |
| JP | 09198639 | 7/1997 |

(Continued)

OTHER PUBLICATIONS

Geer, C.P., et al., "High-Speed Attachment for Data Collection," IBM Technical Disclosure Bulletin, Aug. 1983, pp. 1703-1708, vol. 26, No. 3B, IBM Corp.

(Continued)

Primary Examiner—Fred Tzeng
(74) Attorney, Agent, or Firm—Jeffrey P. Aiello

(57) ABSTRACT

A system and method for writing data to a magnetic tape that may provide improved data writing and throughput is provided. First data accumulated in the buffer is written to a temporary recording area on the tape. The first data is then written to a normal recording area on the tape. Second data may be received while the first data is rewritten to the normal recording area. Second data received during data rewriting is accumulated in an area of the buffer not currently being accessed. This makes it possible to handle another write request from a host during rewrite. The second data may be written to the normal recording area so that the second data is contiguous with the first data.

17 Claims, 17 Drawing Sheets

FOREIGN PATENT DOCUMENTS

| | | |
|---|---|---|
| JP | 10255395 | 9/1998 |
| JP | 10289537 | 10/1998 |
| JP | 11176106 | 7/1999 |
| JP | 3305365 | 7/2002 |
| JP | 2004341925 | 12/2004 |
| JP | 200563444 | 10/2005 |
| WO | WO0109895 | 2/2001 |
| WO | WO03065374 | 8/2003 |

OTHER PUBLICATIONS

Hall, G. "A Multi Channel Data Logging System," DECUS Europe 8th Seminar Proceedings, Sep. 1972, pp. 169-174.

Levine, F.E. "Simultaneous Disk Storage and Retrieval," NASA Tech Briefs, Fall 1980, p. 278, vol. 5 No. 3.

\* cited by examiner

SYSTEM AND METHOD FOR WRITING DATA TO MAGNETIC TAPE

BACKGROUND OF THE INVENTION

1. Field of the Invention

The present invention relates to devices and systems for writing data to magnetic tape, and more particularly, to a system and method for writing data to a magnetic tape.

2. Background Information

Tape drives are configured to write data to a magnetic tape. Data is written to the magnetic tape by first accumulating the data in a buffer. Data is then written from the buffer to a magnetic tape, via a write head, at a predetermined timing. Such a write data operation is referred to in the art as a "buffer flush" or "synchronization of writes", hereinafter synchronization.

If a synchronization is carried out without stopping the tape, a long gap on the tape can occur between the data written by a first synchronization and the data written by a subsequent synchronization. As a result, recording area of the tape is wasted.

Therefore, a backhitch is needed so that data is written by a subsequent synchronization, without the long gap on the tape between synchronizations. A backhitch requires that the tape be stopped, reversed to beyond the end of the previous synchronization, stopped again, and accelerated up to speed in the original direction by the time that the end of the previous synchronization is reached. As is understood by those of skill in the art, the backhitch process consumes a considerable amount of time, and the throughput of the tape drive may be reduced dramatically.

A technique for overcoming the disadvantage of backhitch operations is a Recursive Accumulating Backhitchless Flush (RABF) operation. Generally, in an RABF operation, a controller of the tape drive first writes data in a buffer. The tape drive receives a synchronization request and the tape drive writes the data from the buffer to a temporary recording area on the tape, with the tape continuously traveling. Simultaneously, the controller recursively accumulates data in the buffer and writes back the data to a normal recording area when either the buffer or the temporary recording area becomes full. Therefore, an RABF synchronization does not need a backhitch for subsequent synchronizations and the time required for synchronization can be reduced.

An exemplary RABF is disclosed in U.S. Pat. No. 6,856,479, to Jaquette et al., and assigned to International Business Machines Corporation, Armonk, N.Y. Disclosed therein, is a controller that detects a pattern of synchronizing events for received data records to be written to tape. The controller writes each transaction data records to the magnetic tape, accumulates the synchronized transactions in a buffer, and subsequently recursively writes the accumulated transactions of data records from the buffer to the tape in a sequence. A single backhitch may be employed to place the recursively written accumulated data records following the preceding data.

Another exemplary RABF is disclosed in U.S. Pat. No. 6,865,043, to Akaku et al., assigned to International Business Machines Corporation, Armonk, N.Y. Disclosed therein, special fields for error recovery are provided in data set information tables of data sets written with synchronized transactions. If a transaction only partially fills a data set, that data set is rewritten in a succeeding data set, appending the next transaction. A moving access point in the table identifies the appended transaction, allowing the rewritten transaction to be skipped during read recovery. The table provides recovery trails by providing a thread to the data sets together, the status of the data set, and pointers, such as identifying the wrap of the immediately succeeding data set.

However, under certain circumstances the controller of the tape drive may not immediately respond to a synchronization request. For example, specific to linear recording, a change in the recording position of the write head may delay the response to the synchronization request. Examples of recording position changes include wrap-change where the position of the write head changes in the tape-width direction and wrap-turn where the position of the write head changes in the recording direction of the tape. A "wrap" is defined in the art as a plurality of tracks, typically 8 tracks, and is a unit by which heads read and write data. When there has been a change in the recording position of the write head, the head may not be positioned at a predetermined track position, and writing or synchronization cannot be performed.

Another circumstance where the controller of the tape drive may not immediately respond to a synchronization request is when the write head is in the process of rewriting. Currently, no synchronization request can be received and processed during rewriting, which may lead to degradation of the performance of the tape drive. Thus, if the controller were able to receive and process a synchronization request, while the tape head was in the process of rewriting, performance of the tape drive could be improved.

Accordingly, there is a clearly-felt need in the art for a tape drive that provides improved tape throughput and an improved data writing.

SUMMARY OF THE INVENTION

A system and method for writing data to a magnetic recording medium that may provide improved data writing and improved recording medium throughput. The system allows data to be received in a buffer during data rewriting.

A controller controls writing of data accumulated in a buffer to a magnetic recording medium, such as magnetic tape. Data received during data writing is accumulated in a predetermined area of the buffer that is accessible for writing the data. The predetermined area of the buffer is an area not being currently accessed for data writing. The controller is able to receive an additional write data request from a host, even during rewrite in RABF (Recursive Accumulating Backhitchless Flush) operation. The predetermined area of the buffer may be a pre-reserved area of an arbitrary segment of a plurality of segments comprising the buffer. Alternatively, the predetermined area of the buffer may be an arbitrary area of a pre-reserved segment of the buffer. The controller may be configured to copy the data received during writing into an area of the buffer that is not currently being accessed for writing the data.

In another embodiment, data requested for synchronization may be written to the magnetic tape, while data is rewritten to the tape. In this embodiment, the buffer accumulates first data to be written to the magnetic tape. First data accumulated in the buffer is written to a temporary recording area on the tape. The temporary recording area may be a portion of the tape used to write data while the tape is moving. The first data is then written to a normal recording area on the tape.

Second data may be received while the data is written to the normal recording area. The second data may be written to the normal recording area as a portion of a target for writing the first data to the normal recording area. Further, the controller may be configured to read the second data written in the normal recording area as the portion of the target, when the first data is written to the normal recording area, in response to a request for reading the second data.

Optionally, the controller may be configured to output a status of the data being written to the temporary recording area a predetermined time after the data is written to the temporary recording area and before the data is written to the normal recording area.

A method for writing data requested for synchronization to a magnetic tape while data is simultaneously rewritten to the tape. The method comprising accumulating first data in a buffer; writing first data to a temporary recording area on a magnetic tape; receiving second data as the first data is being written to the normal recording area on the tape; and writing the second data to the normal recording area so that the second data is contiguous with the first data.

The method may be in the form of a computer program. When the method is running as a computer program on a computer, the program may first control writing of first data accumulated in a buffer to a temporary recording area on the magnetic tape. The program may then control writing of the first data to a normal area of the tape. Upon receiving second data, while the first data is being written to the normal recording area of the tape, the program may control writing of the second data, so that the second data is written to the normal recording area contiguous with the first data.

DESCRIPTION OF THE PREFERRED EMBODIMENTS

Figure 1:
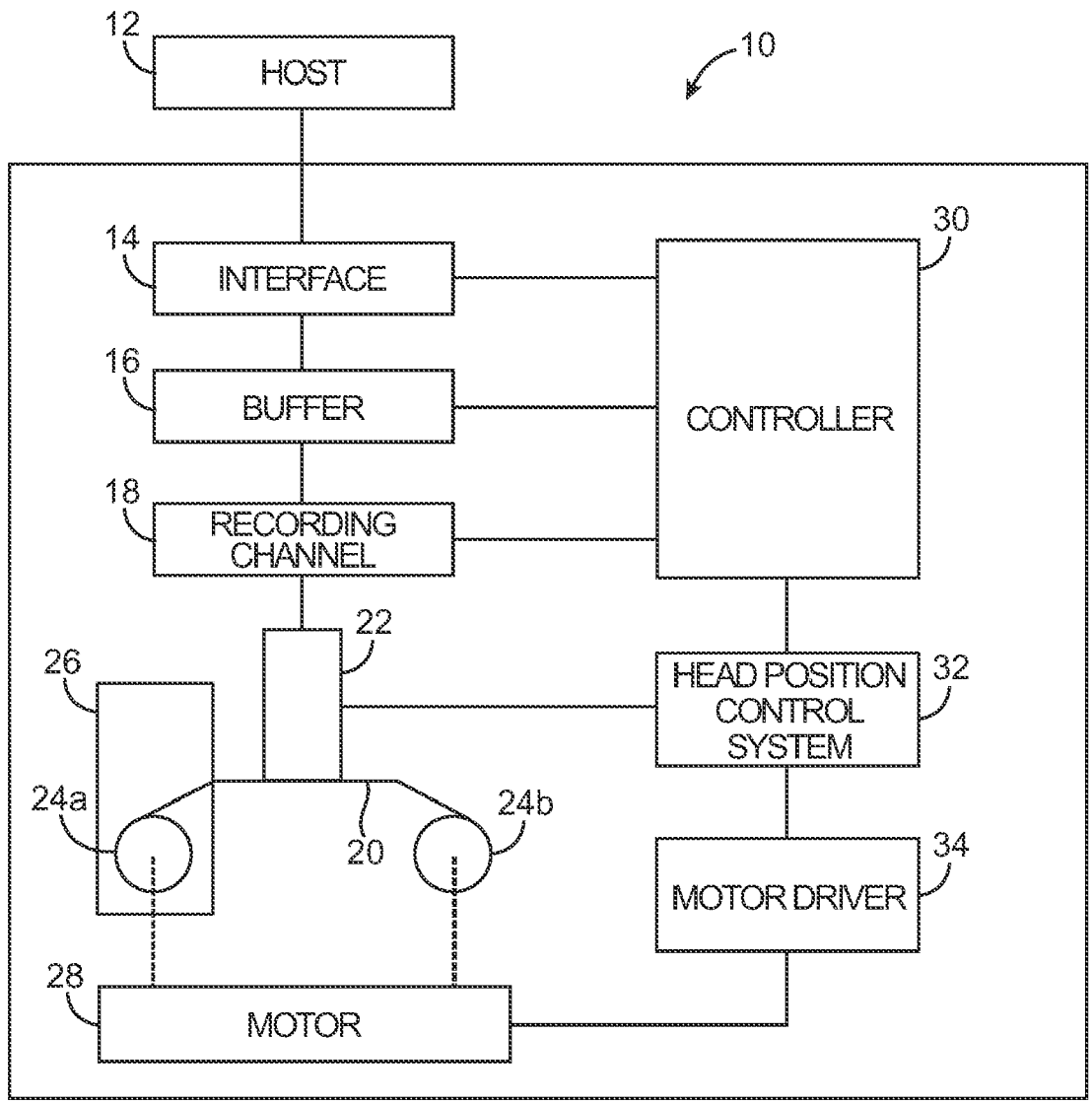
FIG. 1 is a block diagram of a tape drive system of the present invention.
Figure 2:
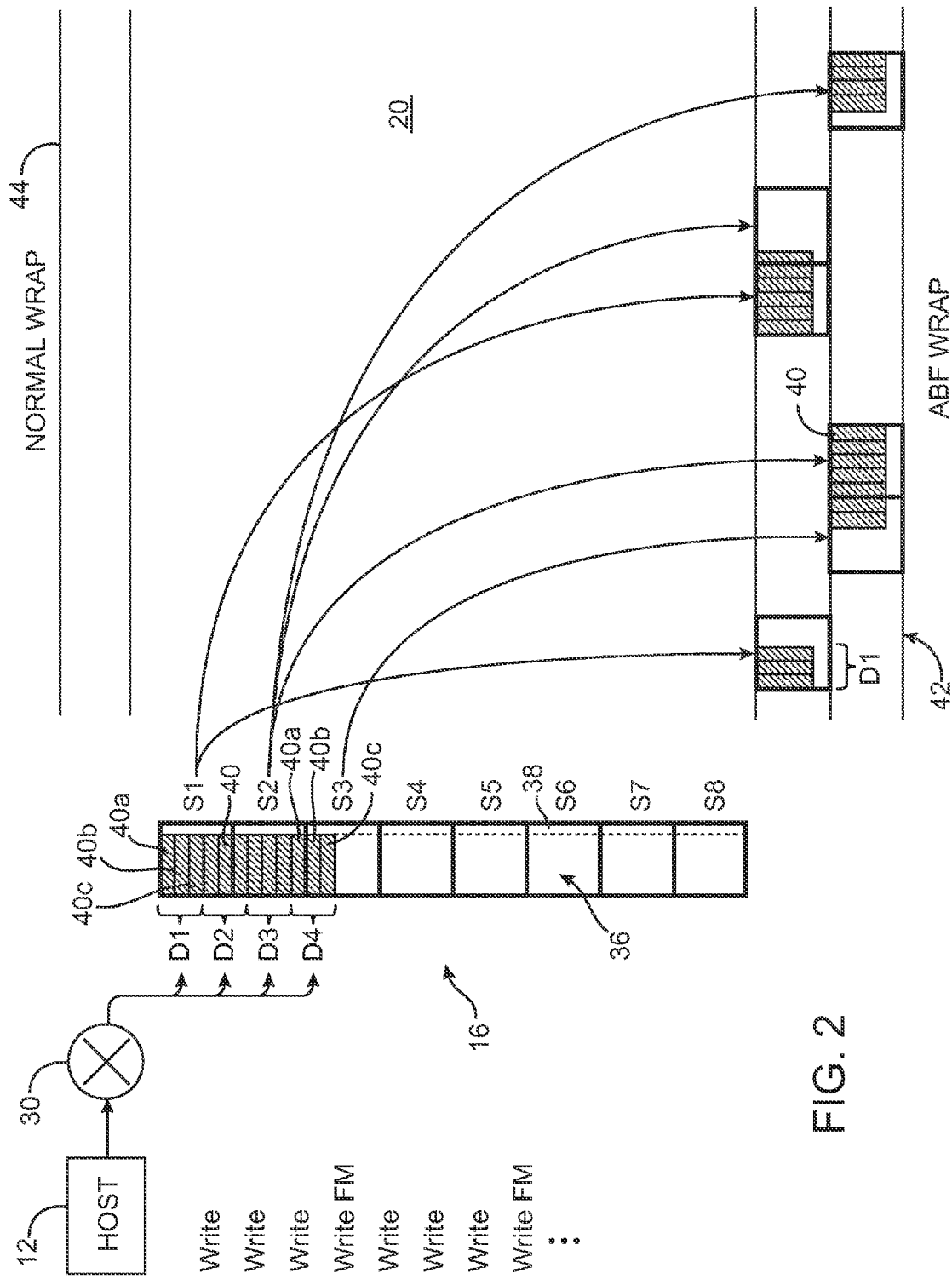
FIG. 2 is a schematic diagram showing a first step of writing data from a buffer to a magnetic recording medium in accordance with an embodiment of the method of the present invention.

Referring to FIG. 1 and FIG. 2 of the drawings, there is shown generally at 10, a tape drive that is coupled to a host 12. The tape drive 10 may include an interface 14 for communicating with the host 12. A buffer 16 for temporary data storage is coupled to the interface 14 and to a recording channel 18. The tape drive 10 may further include a magnetic recording tape 20, a head 22 for reading and writing data on the tape 20, reels 24a and 24b for winding the tape, a cartridge 26, and a motor 28 for rotating the reels 24a, 24b for moving the tape 20. The motor 28 may comprise one or more motors for rotating the reels 24a, 24b.

The drive 10 may also include a controller 30 for controlling many functions of the drive 10. The controller 30 may control writing of data to the tape 20, a head position control system 32, and a motor driver 34. The motor driver 34 drives the motor 28 responsive to instructions received from the controller 30.

The host 12 transmits a command to the tape drive 10 via the interface 14. The command may be writing of data to the buffer 16 or writing of data from the buffer 16 to the tape 20. The host 12 communicates with the interface 14 via known interface standards. For example, the communication standard employed in the interface 14 may be Small Computer System Interface (SCSI). In the case of SCSI, the writing of data to the buffer 16 corresponds to a Write command and the writing of data from the buffer 16 to the tape 20 corresponds to a Write Filemark, or Write FM, command. The interface 14 may return a response to the host 12 to indicate if data processing corresponding to the received commands succeeded or failed.

The recording channel 18 receives instructions from the controller 30 to write the data to the tape 20. The tape 20 is moved longitudinally across the head 22 for writing data to the tape 20. The motor 28 rotates the reels 24a and 24b to move the tape 20 across the head 22. The cartridge 26 may be provided for containing the reel 24a, and thus the tape 20 wound on the reel 24a.

The head position control system 32 is coupled to the controller 30 and to the head 22 for controlling the position of the head 22 on the tape 20 for writing data. The head position control system 32, hereinafter head control system 32, traces one or more of desired wraps. A "wrap" is defined in the art as a plurality of tracks, typically 8 tracks, on the tape 20 and is a data unit by which the head 22 reads data and writes data to the tape 20. When the need for switching a wrap arises, the head control system 32 moves the head 22, to switch the wrap.

The buffer 16 may comprise a known memory device or devices for accumulating data to be written to the tape 20. The buffer 16 may comprise a Dynamic Random Access Memory (DRAM). The buffer 16 may be configured in a plurality of segments S. For example, the buffer 16 may comprise S1 though Sn segments. A buffer 16 comprising eight segments, S1 though S8, is shown for the sake of clarity only, and is not intended to limit the invention in any way.

Each segment S may have several Kbytes of available memory. For example, a segment S of the buffer 16 may have about 400 Kbytes of available memory. A segment of the buffer may comprise an open portion 36 and a reserved portion 38. Typically, the open portion 36 of the segment's available memory is larger than the reserved portion 38. The ratio of available memory of the open portion 36 relative to the reserved portion 38 may be constant. For example, the open portion 36 may comprise about ⅞ of the segment's available memory, while the reserved portion 38 may comprise about ⅛ of the segment's available memory. The reserved portion 38 may be used for storing data received when data is being rewritten (thoroughly discussed hereinafter). Alternatively, whole segments of the buffer 16 may be reserved and whole segments may be open.

Data 40 received during rewriting may be stored in one or more reserved segments S. As discussed hereinafter a collection of data 40 stored in one segment S of the buffer 16 is referred to as a "data set". An "end marker" is data that may be provided to indicate the end of a data set.

Data 40 may be written to the tape 20 by performing a modified Recursive Accumulating Backhitchless Flush (RABF) operation. An example of a modified RABF operation may be performed by first, the controller 30 selecting a segment S1 of the buffer 16 to store data 40. Data 40 accumulates in the selected segment S1 until the segment S1 is near, but less than capacity. Typically data 40 accumulates in the segment's open portion 36. In a segment having about 400 Kbytes of available memory, about 350 Kbytes of data may be stored in the open portion 36, leaving about 50 Kbytes of memory in the reserved portion 38. Once the accumulated data 40 is at or near the capacity of the open portion 36 of the segment S1, the controller 30 selects a subsequent segment S2, for example, of the buffer 16 to store data 40. The data 40 then begins accumulating in the subsequent segment S2.

An end marker (not shown) may be recorded at the end of the data 40 stored in the open portion 36 of the segment S1. To allow the host 12 to request synchronization during rewriting by the tape drive 10, the status is returned to the host 12 by the controller 30, when a data set immediately preceding the transition to rewriting has been completely written to a temporary recording area 42 on the tape 20, thoroughly discussed hereinafter.

When a synchronization request arrives during rewriting, data necessary for the synchronization may be written in the reserved portion 38 of one of the segments S of the buffer 16, and simultaneously written to the tape 20, along with the data being rewritten. The reserved portion 38 of a segment S may be insufficient for writing the data 40. If the reserved portion 38 of the segment S is insufficient, the data 40 may be automatically written into the reserved portion 38 of a next subsequent segment S of the buffer 16. Optionally, the data 40 may be written to the tape 20 together with the data being rewritten is accumulated in the buffer 16.

Referring now to FIG. 1 to FIG. 4 of the drawings, the tape 20 includes a normal recording area 44, or normal wrap, and a temporary recording area 42, or ABF wrap. The normal recording area 44 of the tape 20 comprises a plurality of tracks and is the portion of the tape 20 where data is normally recorded on the tape 20, the normal recording area 44 is a normal wrap. The temporary recording 42 also comprises a plurality of tracks and is the portion of the tape 20 where data 40 is recorded while the tape 20 is moving.

Referring particularly to FIG. 2, there is shown a process for writing data received from the host 12 to the temporary recording area 42. The host 12 first sends a series of Write commands, then a Write FM command to the buffer 16, via the controller 30. Typically three Write commands are sent, then a single Write FM command. For each Write command, a single data 40 is written to a selected segment S of the buffer 16. A plurality of data 40a, 40b, 40c may comprise a data set D. As shown in FIG. 2, the host 12 sends three Write commands representing three data 40a, 40b, 40c to the controller 30. The controller 30 writes the data 40a, 40b, 40c to a selected segment S1 of the buffer 16. The data 40a, 40b, 40c comprises data set D1.

The host 12 then sends a Write FM command to the controller 30. The controller 30 sends the Write FM command to the selected segment S1 of the buffer 16. Upon receipt of the Write FM command, the data set D1 is written to the temporary recording area 42 of the tape 20.

The host 12 may then send a subsequent series of Write commands to the buffer 16 via the controller 30. The controller 30 controls writing of the next three data 40, comprising a second data set D2 to the selected segment S1 of the buffer 16. If the available memory in the selected segment S1 is insufficient, a portion of the data set D2 will be written into a next segment S2 of the buffer 16. The host 12 sends a second Write FM command to the controller 30. The controller 30 sends the Write FM command to the selected segments S1 and S2 of the buffer 16 containing the data set D2. Upon receipt of the Write FM command, the data set D2 is written to the temporary recording area 42.

Figure 3:
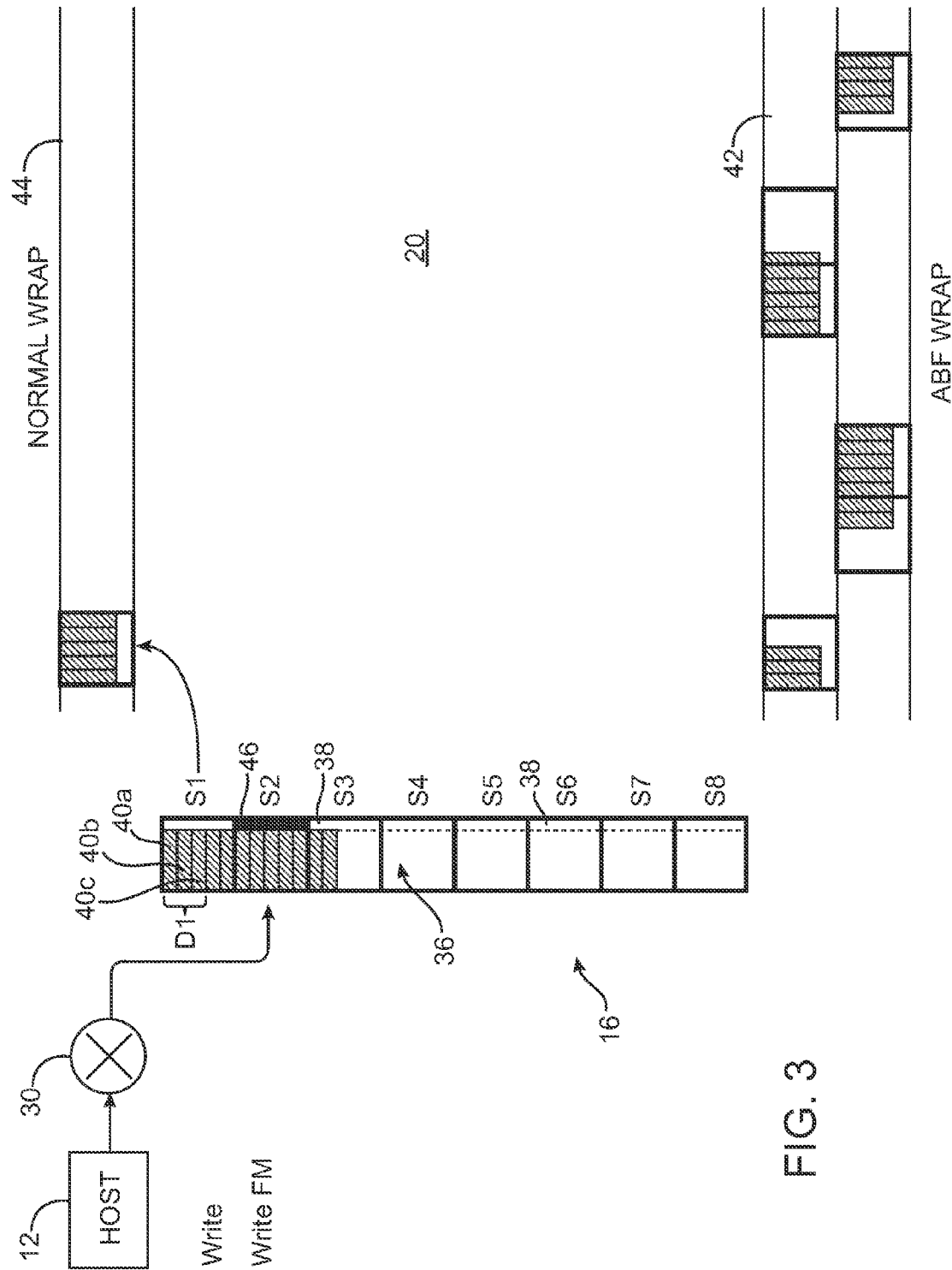
FIG. 3 is a schematic diagram showing a second step of writing data from the buffer to the magnetic recording medium in accordance with an embodiment of the invented method.
Figure 4:
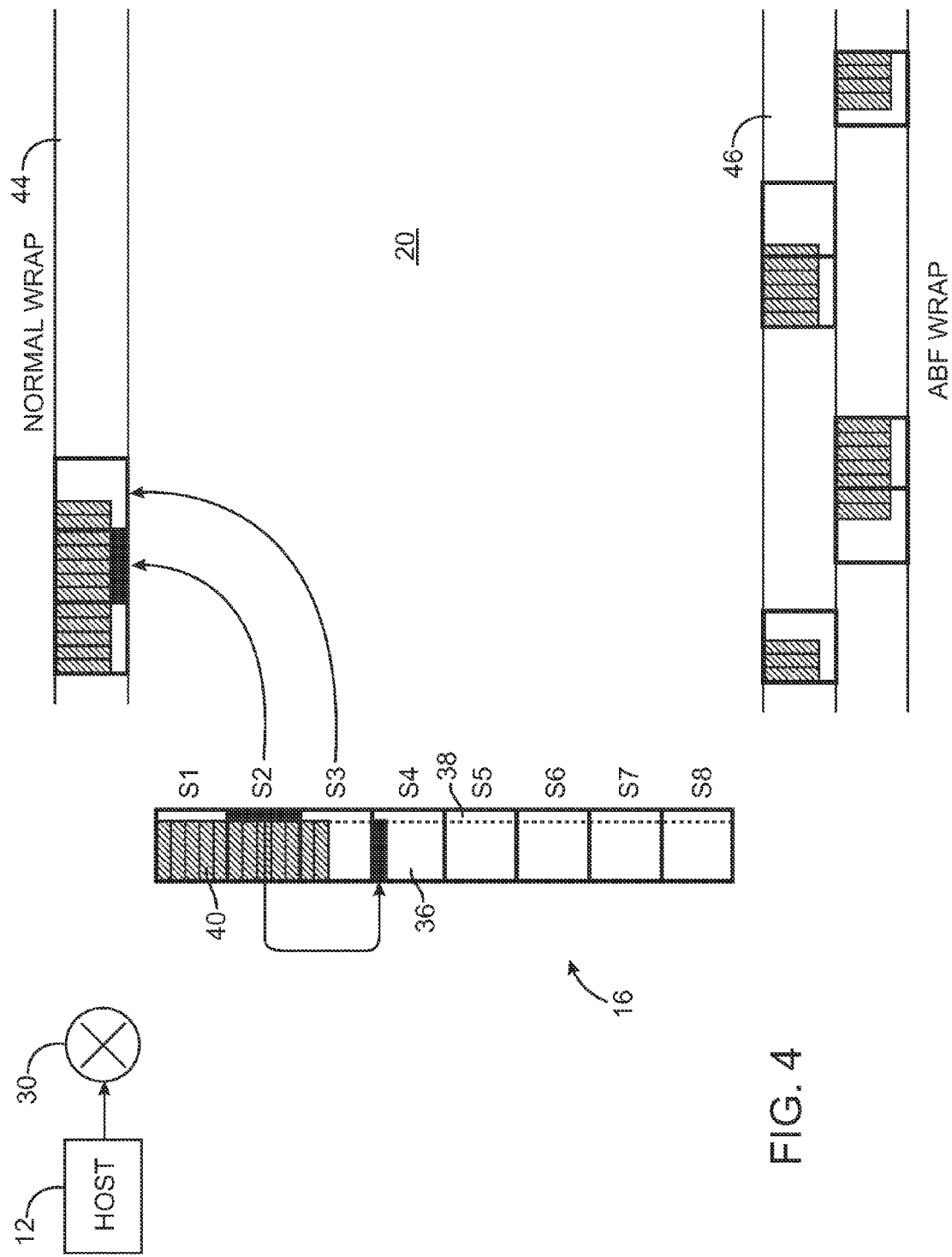
FIG. 4 is a schematic diagram showing a third step of writing data from the buffer to the magnetic recording medium in accordance with an embodiment of the invented method.

Referring to FIG. 3 and FIG. 4, after data 40 is written to the temporary recording area 42 of the tape 20, data is rewritten to the normal recording area 44. As shown in FIG. 3, if a Write command is received from the host 12 while the data set D1 in the segment S1 is being rewritten to the normal area 44, second data 46 from the host 12 may be stored in the reserved portion 38 of the second segment S2, while the data set D1 from the first segment S1 is written to the normal area 44. The data set D2 in the second segment S2 is then written adjacent to the data D1 of the first segment S1 in the normal recording area 44 of the tape 20.

The second data 46 written to the reserved portion 38 of the segment S2 during rewriting, is also written to the normal recording area 44 of the tape 20. Any data, such as data set D4 in a third segment S3, or subsequent segment S4 to S8, is also written adjacent to the data set stored in segment S2 in the normal area 44. The second data 46 written into the reserved portion 38 of segment S2 is then copied into a next subsequent segment S4 to be written to the temporary recording area 42 of the tape 20, to prepare the second data 46 for the next RABF operation. Thereby, the second data 46 that is temporarily stored in the reserved portion 38 of a segment S is written to the normal area 44 of the tape 20.

Figure 5:
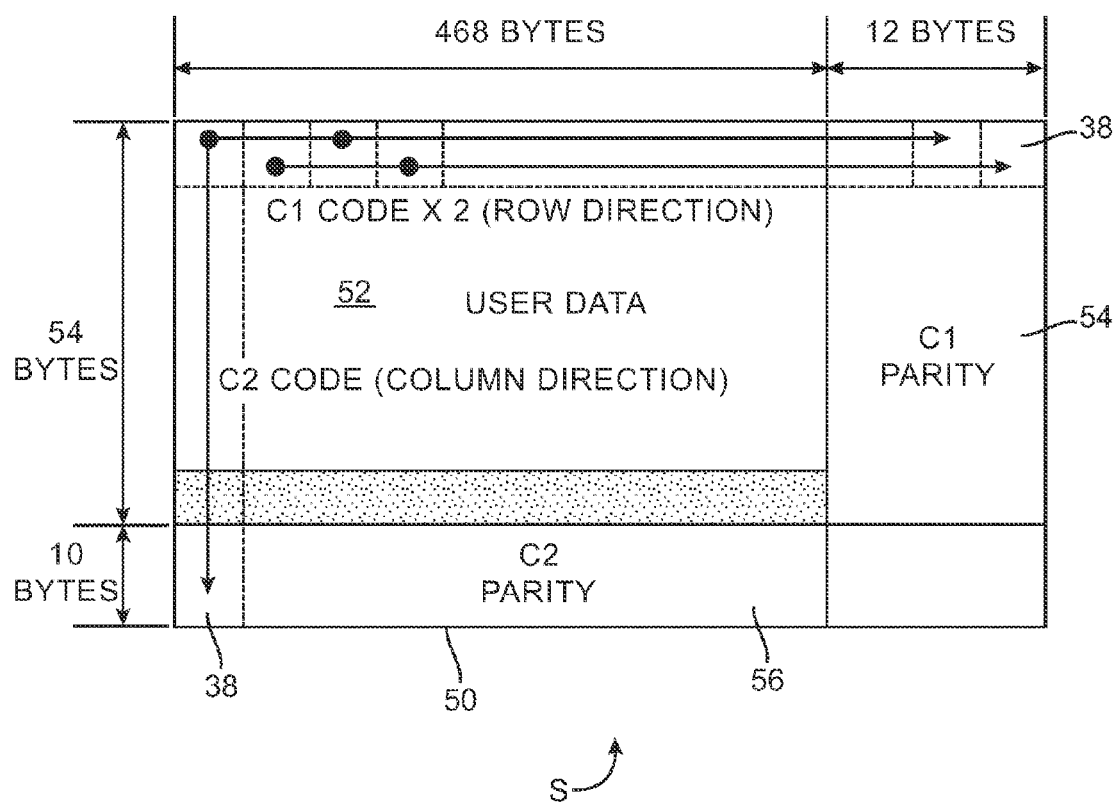
FIG. 5 is a schematic diagram showing a data set.

FIG. 5 shows an exemplary data structure 50 of a segment S of the buffer 16. The segment's data structure 50 includes a user data portion 52 that may be approximately 468 bytes×54 bytes, for example. Parity code 54, 56 may be appended to user data stored in the user data portion 52 when error correction is employed. Parity code 54 may be used for correcting errors in a row direction of the user data and may contain the parity code for data containing even number of bytes and an odd number of bytes. Parity code 56 represents parity code used for correcting errors in the column direction of the user data. The data structure 50 of each segment S also includes the reserved area 38, indicated by dotted lines in the Figure.

Figure 6:
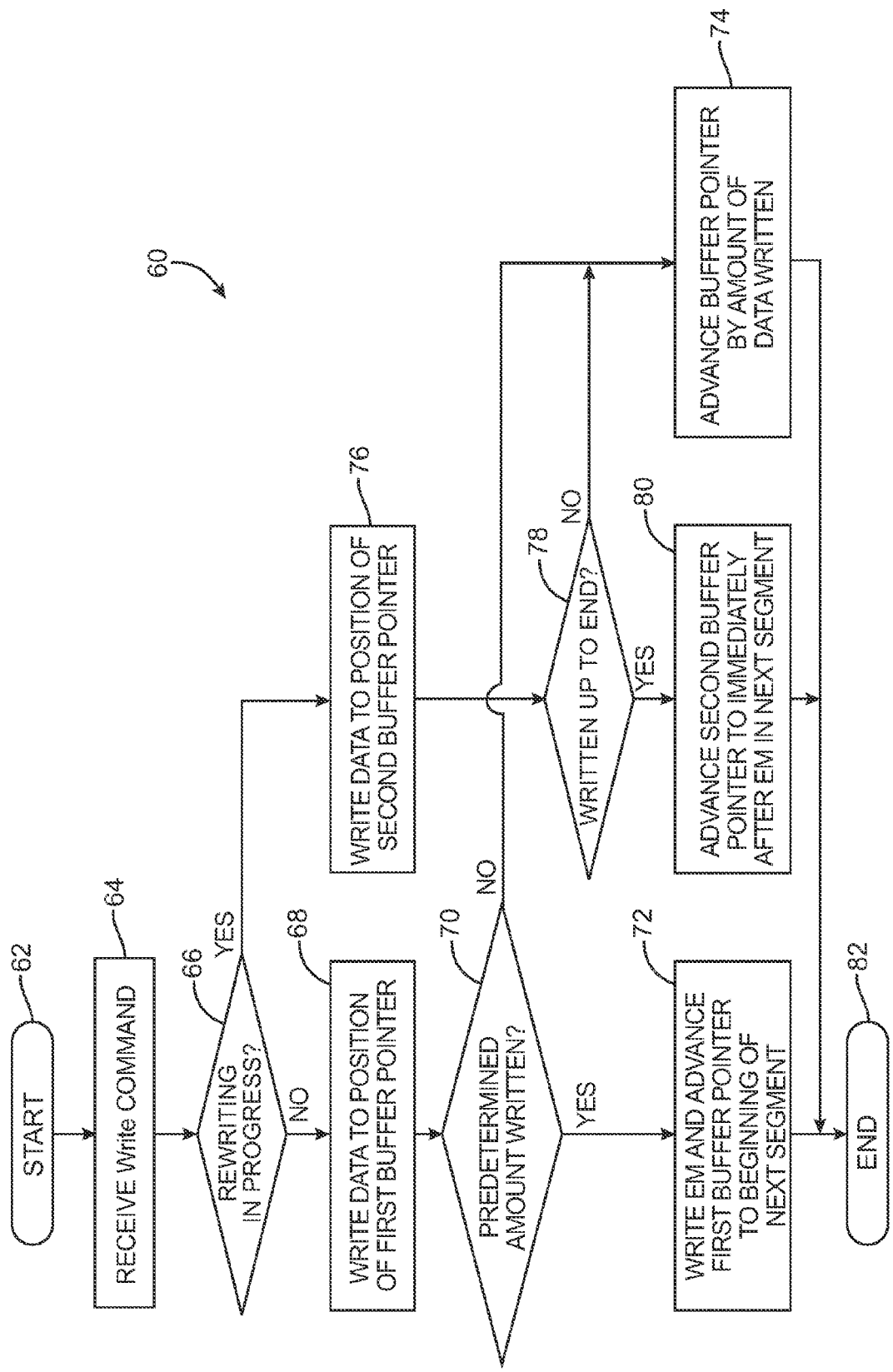
FIG. 6 is a flow diagram depicting a process of a controller of the tape drive of FIG. 1 when a Write command is received by the controller in accordance with an embodiment of the invented method.

Referring to FIG. 1 to FIG. 6, and particularly to FIG. 6, there is shown a flow diagram illustrating a process 60 of writing data. The process 60 commences at start block 62. In process block 64 the controller 30 receives a Write command from the host 12 via the interface 14. In decision block 66 the controller 30 determines if data 40 is being transferred from the buffer 16 to the recording channel 18 for performing rewriting. The controller 30 may make this determination by reading a flag in memory. If it is determined that rewriting is not in progress, the data writing process 60 continues to process block 68, where the controller 30 writes data 40 to a position indicated by a first buffer pointer (not shown) in the buffer 16. The position indicated by the first buffer pointer may be the open portion 36 of a selected segment S.

The process 60 continues to decision block 70, where the controller 30 determines if a predetermined amount of data 40 has been written in the open portion 36 of the selected segment S. If it is determined that the predetermined amount of data 40 has been written, an End Marker is written in the segment S and the first buffer pointer is advanced to the beginning of a next segment S, show in process block 72. If it is determined, in decision block 70, that the predetermined amount of data 40 has not been written, the process 60 then continues to process block 74, where the first buffer pointer is advanced by the amount of data written.

Returning to decision block 66, if it is determined that rewriting is in progress, the process 60 continues to process block 76, where the controller 30 writes second data 46 to a position indicated by a second buffer pointer (not shown). The position indicated by the second buffer pointer may be the reserved portion 38 of the selected segment S.

In decision block 78, it is determined if the second data 46 written to the reserved portion 38 of the segment S consumes the reserved portion 38 S. If it is determined that the reserved portion 38 of the segment S is full, in process block 80, the second buffer pointer is advanced to immediately after the end marker of the next segment S. If it is determined that the second data 46 written to the segment S does not consume the reserved portion 38 of the segment S, the second buffer pointer is advanced by the amount of data written, shown in process block 74. The process 60 ends at end block 82.

Figure 7:
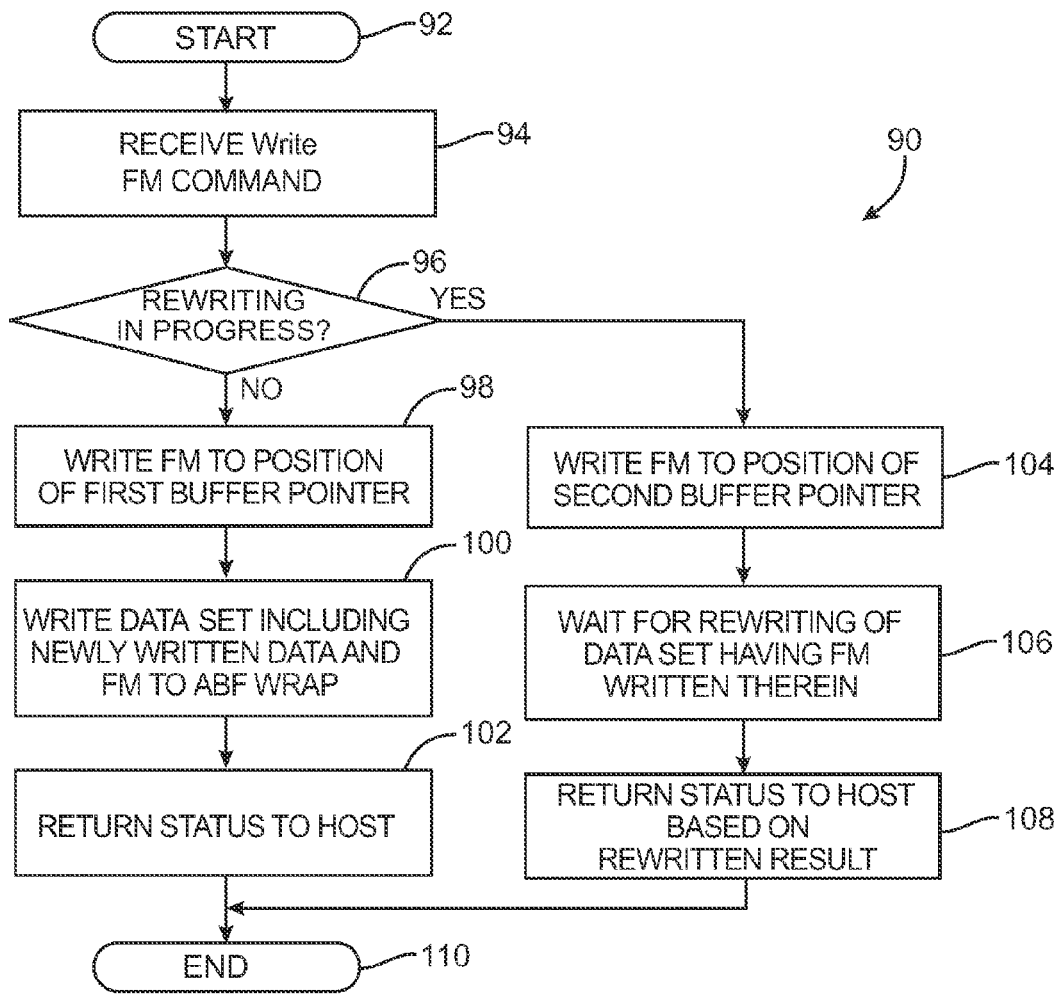
FIG. 7 is a flow diagram depicting a process of the controller when a Write FM command is received of the invented method.

FIG. 7 illustrates a process 90 for receiving a Write FM, or write "file mark", command from the host 12. The process 90 commences in start block 92. In process block 94 the controller 30 receives a Write FM command from the host 12. The controller 30 then determines if rewriting is in progress, in decision block 96, as previously discussed. If it is determined that rewriting is not in progress, the process 90 continues to process block 98. In process block 98, the controller 30 writes the number of File Marks, including 0, specified by the command to the position of the first buffer pointer.

The controller 30 then writes the data newly written in the buffer 16 and any File Marks to the temporary recording area 42 on the tape 20, shown in process block 100. In process block 102, the controller 30 returns a status signal to the host 12, indicating that writing to the tape 20 is completed.

Returning to decision block 96, if it is determined that rewriting is in progress, the process continues to process block 104, where the controller 30 writes the number of File Marks specified by the command to the position of the second buffer pointer. The controller 30 waits for rewriting of the data set D having the File Mark, or File Marks, written therein, in process block 106. In process block 108, the controller 30 returns a status signal to the host 12, based on the rewritten result. Thus, data sets D written in the temporary recording area 42 are rewritten to the normal recording area 44 at a predetermined timing. The Write FM process 90 ends at end block 110.

Figure 8:
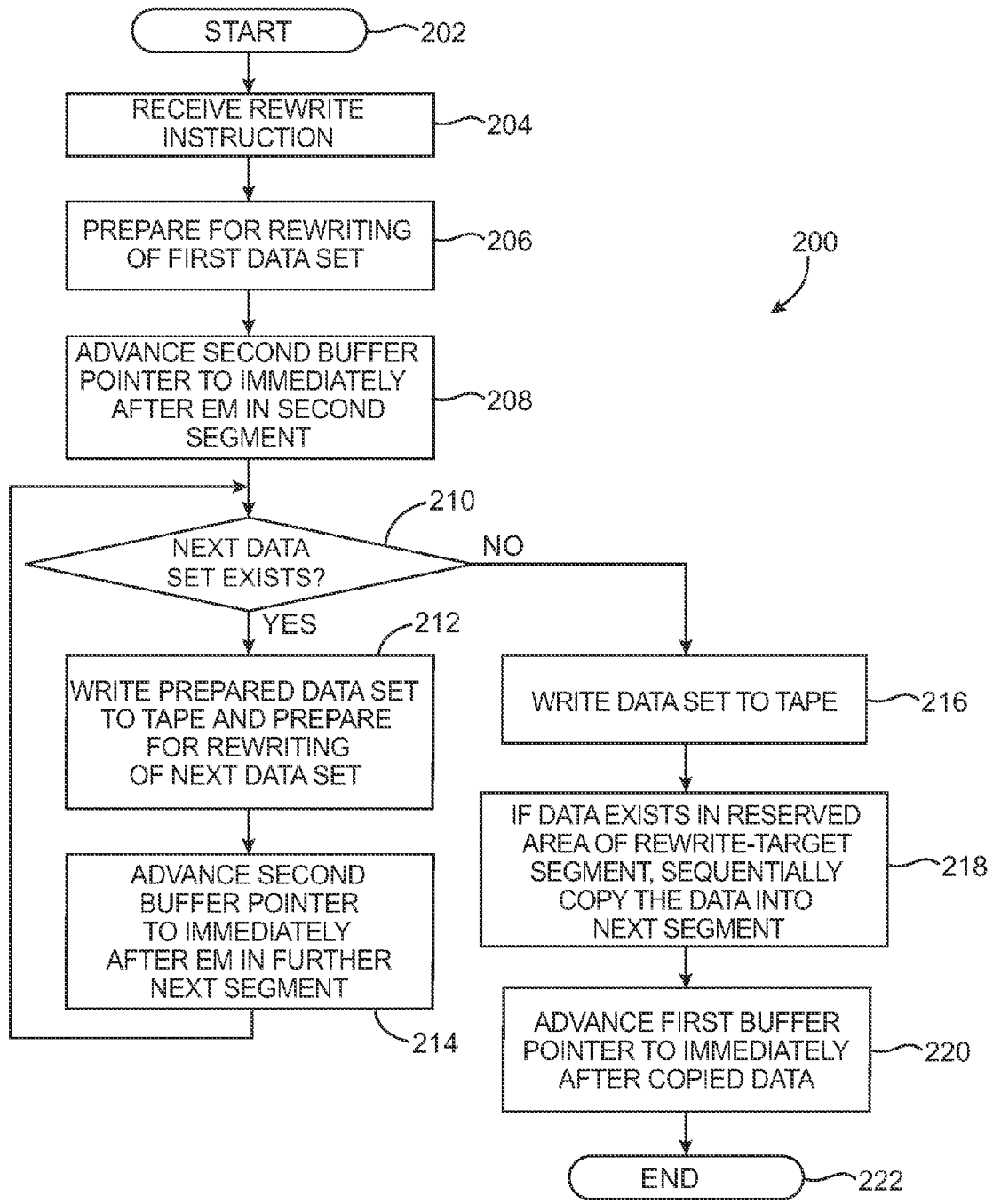
FIG. 8 is a flow diagram depicting a process of the controller when performing a rewriting process of the method of the invention.

Referring to FIGS. 2 through 4, and referring particularly to FIG. 8, there is shown a flow diagram illustrating a process 200 for rewriting data from the temporary recording area 42 to the normal recording area 44 of the tape 20. The rewriting process 200 begins at start block 202. In process block 204, the controller 30 receives an instruction to perform rewriting. The instruction to perform rewriting may be issued when the buffer 16 has no available storage space or when the temporary recording area 42 has been fully consumed. The rewriting instruction may be generated by an external source that may monitor the available storage space of the buffer 16 or the usage status of the temporary recording area 42, or both.

Upon receiving the rewrite instruction, the controller 30 prepares to rewrite the data set D1 in the first segment S1 to the normal recording area 44, in process block 206. Preparation for rewriting the data set D1 may include computation of parity codes and other known processes. In process block 208, data sent from the host 12 cannot be written to the segment S where rewriting is in progress. The second buffer pointer, that indicates the data writing position during rewriting, is advanced to immediately after the End Marker of the second segment S2.

In decision block 210, the controller 30 determines if a next data set D exists in a next segment S. If it is determined that a data set D exists in the next segment S, then the process 200 continues to process block 212, where the controller 30 writes the data set D1 in the first segment S1, which has been prepared for rewriting, to the normal recording area 44 of the tape 20. Simultaneously, the controller 30 prepares for rewriting of the second data set D2 in the second segment S2.

In process block 214, the second buffer pointer is advanced to immediately after the End Marker of the next subsequent segment S3. As shown in FIGS. 2 to 4, since data set D4 exists in segment S3, the controller 30 writes the data set D1 in segment S1 to the normal recording area 44, while simultaneously preparing for rewriting the data set D2 in the next segment S2, and advances the second buffer pointer to immediately after the End Marker of the next subsequent segment S3.

Accordingly, if data exists in the (N+2)th segment, the controller 30 repeatedly performs the operation of writing the data in the Nth segment to the normal recording area 44 while simultaneously preparing for rewriting of the data in the (N+1)th segment, and advancing the second buffer pointer to immediately after the End Marker of the (N+2)th segment, when N=2, 3, and so on.

Returning to decision block 210, if it is determined that a data set D does not exist in the (N+2)th segment, the process 200 continues to process block 216. In process block 216 the controller 30 writes the data set D in the Nth segment to the normal recording area 44 while simultaneously preparing for rewriting of the data set D(N+1) in the (N+1)th segment, and also writes the data set D in the (N+1)th segment to the normal recording area 44 of the tape 20. In the example shown in FIGS. 2 to 4, since data does not exist in segment S4, the controller 30 writes the data set D3 in the segment S2 is to the normal recording area 44, and then writes the data set D4 in the segment S3 to the normal recording area 44.

If second data 46, received during rewriting and stored in the reserved portion 38 exists, the second data 46 is sequentially copied into the next segment S, as shown in process block 218. In process block 220, the first buffer pointer is advanced to immediately after the copied second data 46. The process then ends in end block 222.

In summary, if a synchronization request is issued when rewriting is not in progress, data is written to the temporary recording area 42 of the tape 20, and a synchronization response is returned to the host 12. Thereafter data is written to the normal recording area 44. If a synchronization request is issued and rewriting is in progress, the data is written to the normal recording area 44 together with the data being rewritten, and a synchronization response is returned to the host 12. Thereafter, data is first written to the temporary recording area 42, then to the normal recording area 44 according to normal RABF operation.

It is to be understood that the status signal previously described may not be instantaneously transmitted to the host 12. The status signal may not be instantaneously transmitted to the host 12, depending upon the communication standard, such as the SCS1 communication standard, employed between the drive 10 and host 12. Thus, the host 12 may issue a request to read data that was abnormally recorded in the normal recording area 44. When a request to read abnormally recorded data is issued, the tape drive 10 performs recovery processing, where the controller 30 reads data recorded at another location and returns that data to the host 12.

Figure 9:
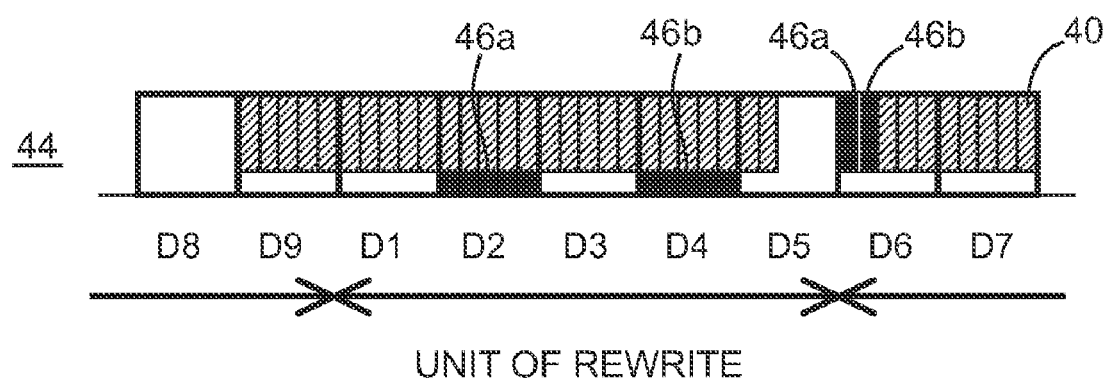
FIG. 9 is a schematic diagram showing an exemplary layout of a data set on a magnetic recording medium used for describing a Read process of an embodiment of the invented method of the present invention.
Figure 10:
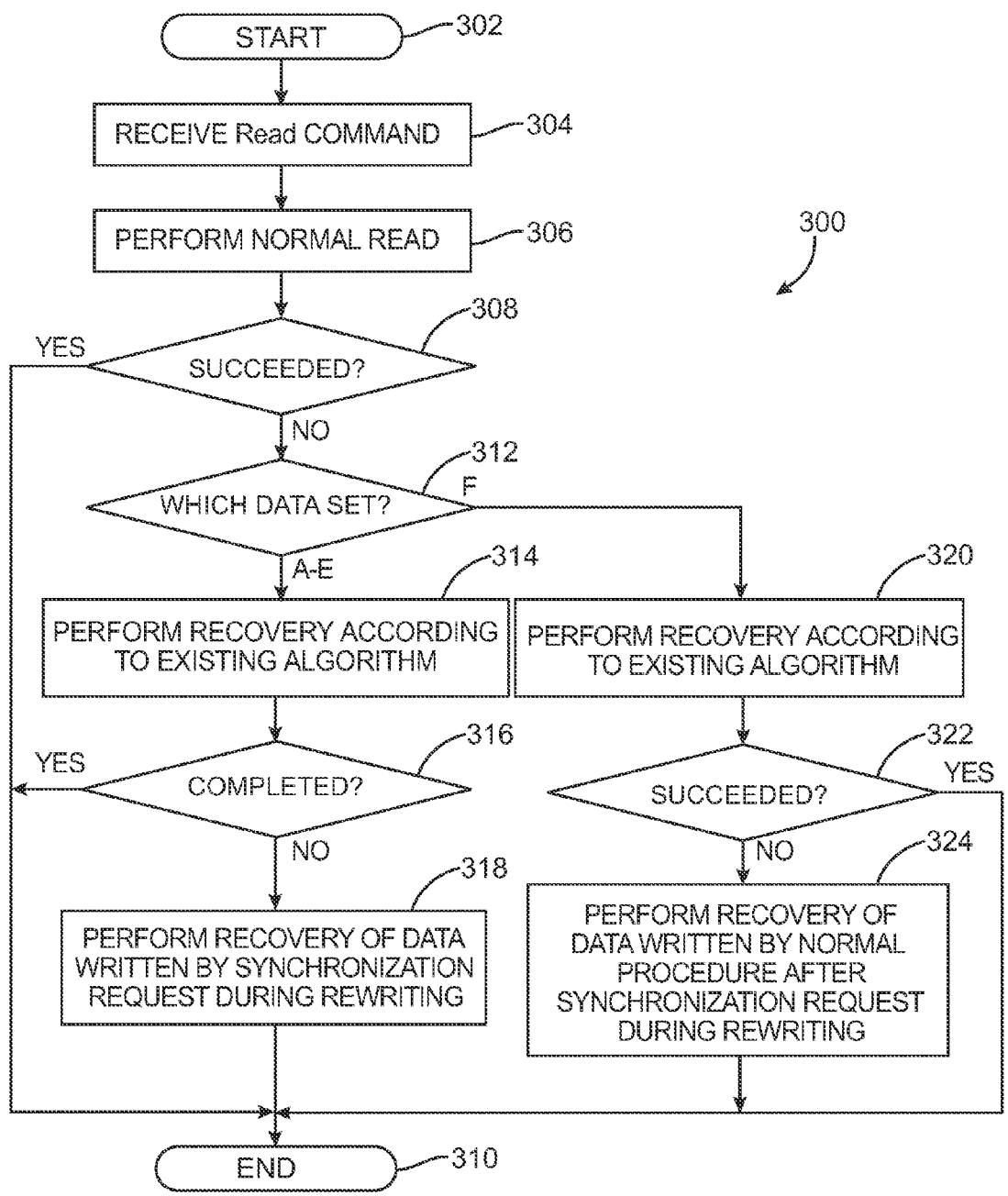
FIG. 10 is a flow diagram depicting a Read process performed by the controller of the invented method.

Referring now to FIG. 9 and FIG. 10, a read process 300, including recovering abnormally recorded data, is shown in the flow diagram. The process 300 commences in start block 202. In Process block 304 the controller 30 receives a Read command from the host 12. Each data set D may be provided with a flag indicating that an RABF operation is to be performed starting from a second data set. Data set D2 and data set D4 may be provided with a flag that indicates the data set was written during rewriting and contains second data 46.

Upon receipt of the Read command, the controller 30 reads data from the normal recording area 44 of the tape 20, via the recording channel 18, shown in process block 306. The data set D2 and data set D4 may be written only for synchronization, and may be skipped by detecting their End Markers. The controller 30 determines, in decision block 308, if the data 40 was successfully read. If the data 40 was successfully read, the process ends in end block 310. If the data 40 was not successfully read, the controller 30 determines the type of data set D that failed to be read, in decision block 312.

As shown in FIG. 9, the determined type of the data set D may be a data set that does or does not include second data 46. If the data set does not include second data 46, the data set D is read from the temporary recording area 42 and transmitted to the host 12 in process block 314. In decision block 316, the controller 30 determines if all the data 40 to be sent to the host 12 has been transmitted.

If it is determined, in decision block 316, that all data 40 has been transmitted to the host 12, the process ends in end block 310. If it is determined that all data 40 has not been transmitted to the host 12, the second data 46 is recovered in process block 318, by reading and transmitting the second data 46 to the host 12. Since the tape drive 10 writes the second data 46 to the normal recording area 44 and returns a synchronization success notification to the host 12, the drive 10 reads and returns such second data 46 in response to a read request from the host 12.

A data set D may comprise both data 40 and second data 46, as shown in data set D6. If it is determined, in decision block 312, that a data set includes both data 40 and second data 46, the data set D6 may be subjected to recovery according to an existing algorithm, shown in process block 320. The data set D6 is first read from the temporary recording area 42 and transmitted to the host 12. The second data 46 of the data set D6 is checked, in decision block 322, to determine if the recovery was successful.

If the recovery was successful the process 300 ends at end block 310. If the recovery was not successful, recovery is performed using second data 46 from previous data sets D, shown in processes block 324. Particularly, if the host 12 was unable to read a first second data 46a of the data set D6, the second data 46 of data set D2 is read and transmitted to the host 12. If the host 12 was unable to read a second second data 46b of the data set D6, the second data 46 of data set D4 is read and transmitted to the host 12. The process 300 then ends at end block 310.

It is to be understood that a segment S receiving data 40 from the host 12 during rewriting may be located at any position in the buffer 12, as long as it is not the segment S being currently accessed for rewriting and is to be accessed for current rewriting. Further, it is to be understood that second data 46, received during rewriting, may be stored in both the reserved portion 38 of a segment S targeted for rewriting and a segment S not targeted for rewriting when data 40 is received.

Figure 11:
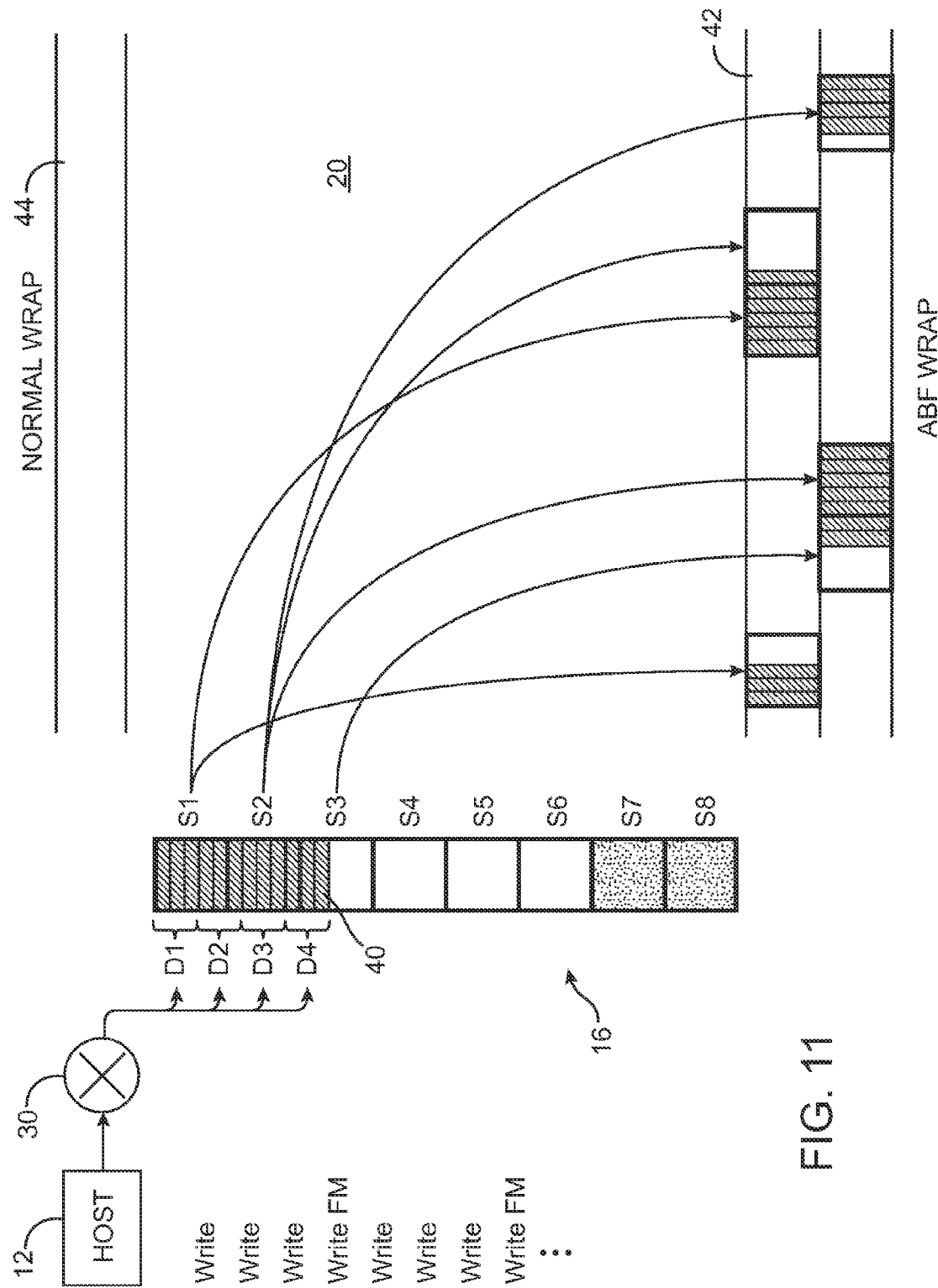
FIG. 11 is a schematic diagram showing a first step of writing from the buffer to the magnetic recording medium according to an alternative embodiment of the present invention.
Figure 12:
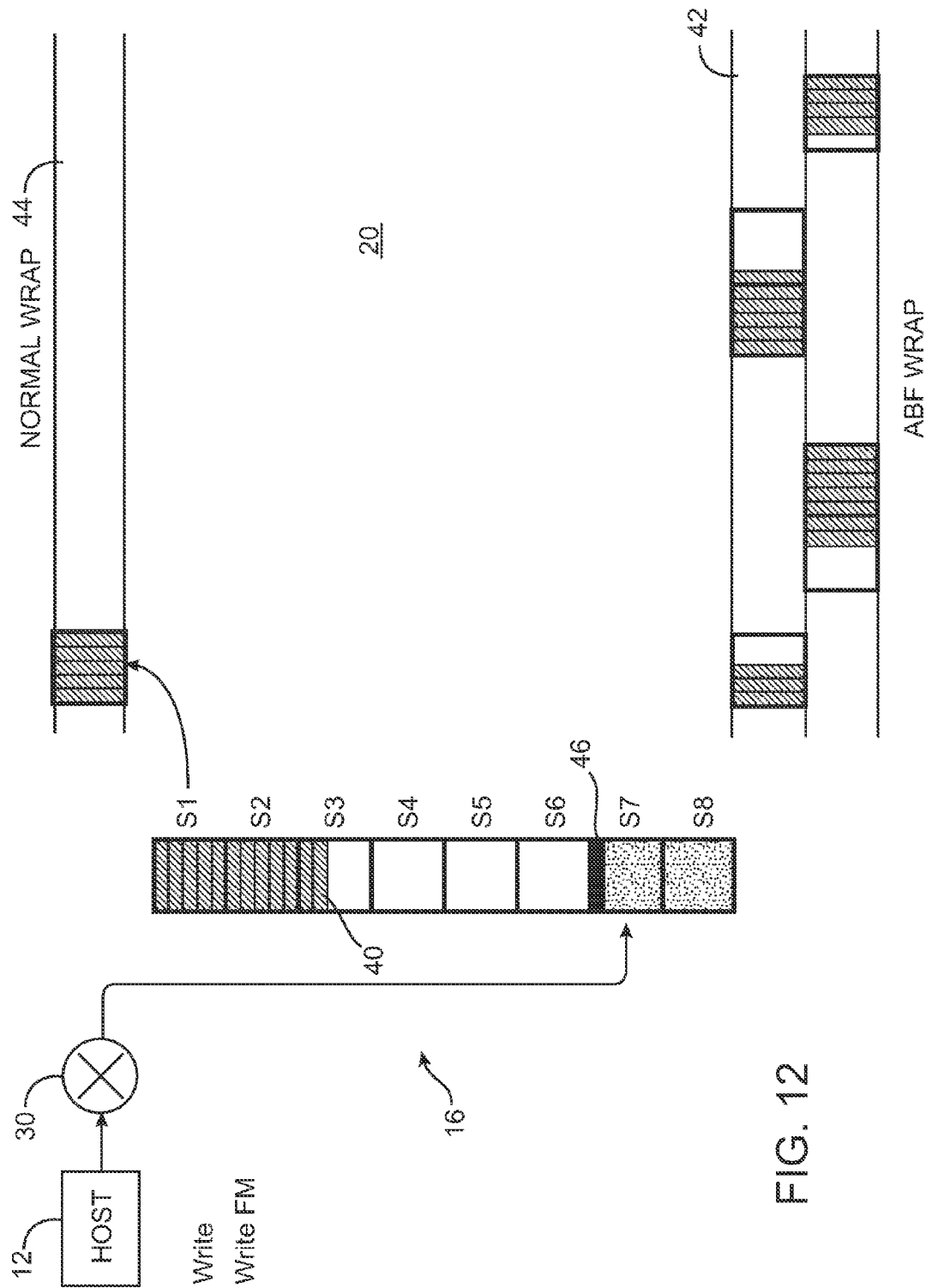
FIG. 12 is a schematic diagram showing a second step of the writing from the buffer to the magnetic recording medium according to the alternative embodiment of the invented method of the present invention.
Figure 13:
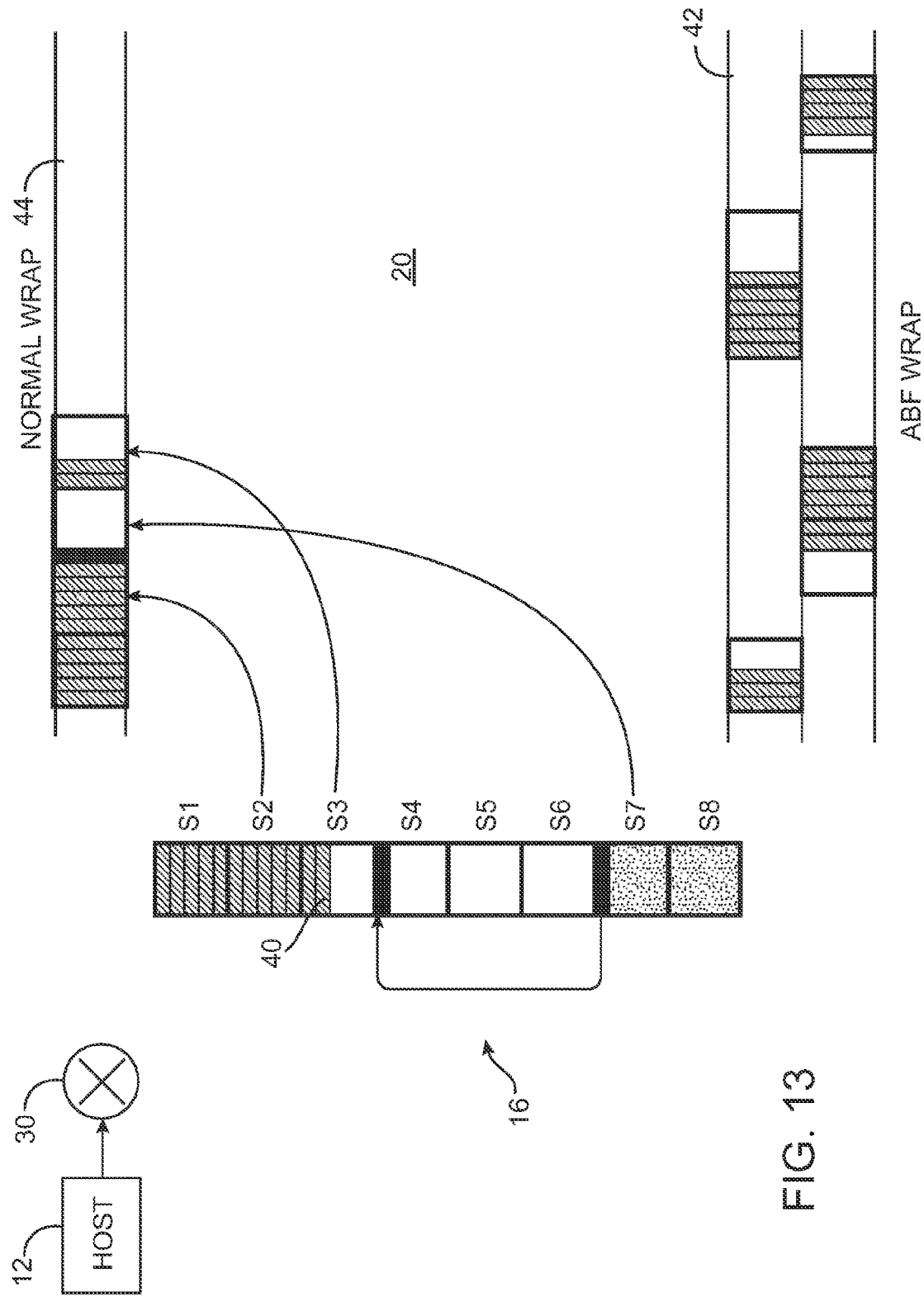
FIG. 13 is a diagram for showing a third step of writing data from the buffer to the magnetic recording medium according to the alternative embodiment of the invented method.

FIG. 11 to FIG. 13 illustrate an alternative embodiment of the system and method for writing data to magnetic tape. In the alternative embodiment, a portion of the plurality of segments may comprise reserved segments for storing data received from the host 12 during rewriting. By way of example, segment S7 and segment S8 comprise reserved segments and segment S1 through segment S6 comprise open segments.

When a Write command and/or a Write FM command are sent from the host 12 while the data set D1 in the segment S1 is being rewritten to the normal recording area 44, data sent from the host 12 may be stored in a reserved segment S7 and becomes second data 46 (as previously discussed). The data set in segment S2 is then written adjacent to the segment S1 in the normal recording area 44.

The second data 46 in the segment S7 is then written adjacent to the segment S2 in the normal recording area 44. In the alternative embodiment, data sets D are prepared for rewriting and rewritten with priority. Thus, the data set D in a reserved segment may be rewritten prior to rewriting data sets D from non-reserved segments S. Alternatively, a reverse order may not occur, if the data in the buffer 16 is rewritten in order from segment S2 to segment S8. After the second data 46 in the segment S7 is written to the normal recording area 44, the data set D in the segment S3 is written adjacent to the segment S7.

To prepare the second data 46 for rewriting, the second data 46 is copied into a segment S4 that is undergoing the next RABF operation. Accordingly, data written in a reserved segment during rewriting is copied into a segment S undergoing the next RABF operation, for rewriting the data 46 to the normal recording area 44.

Figure 14:
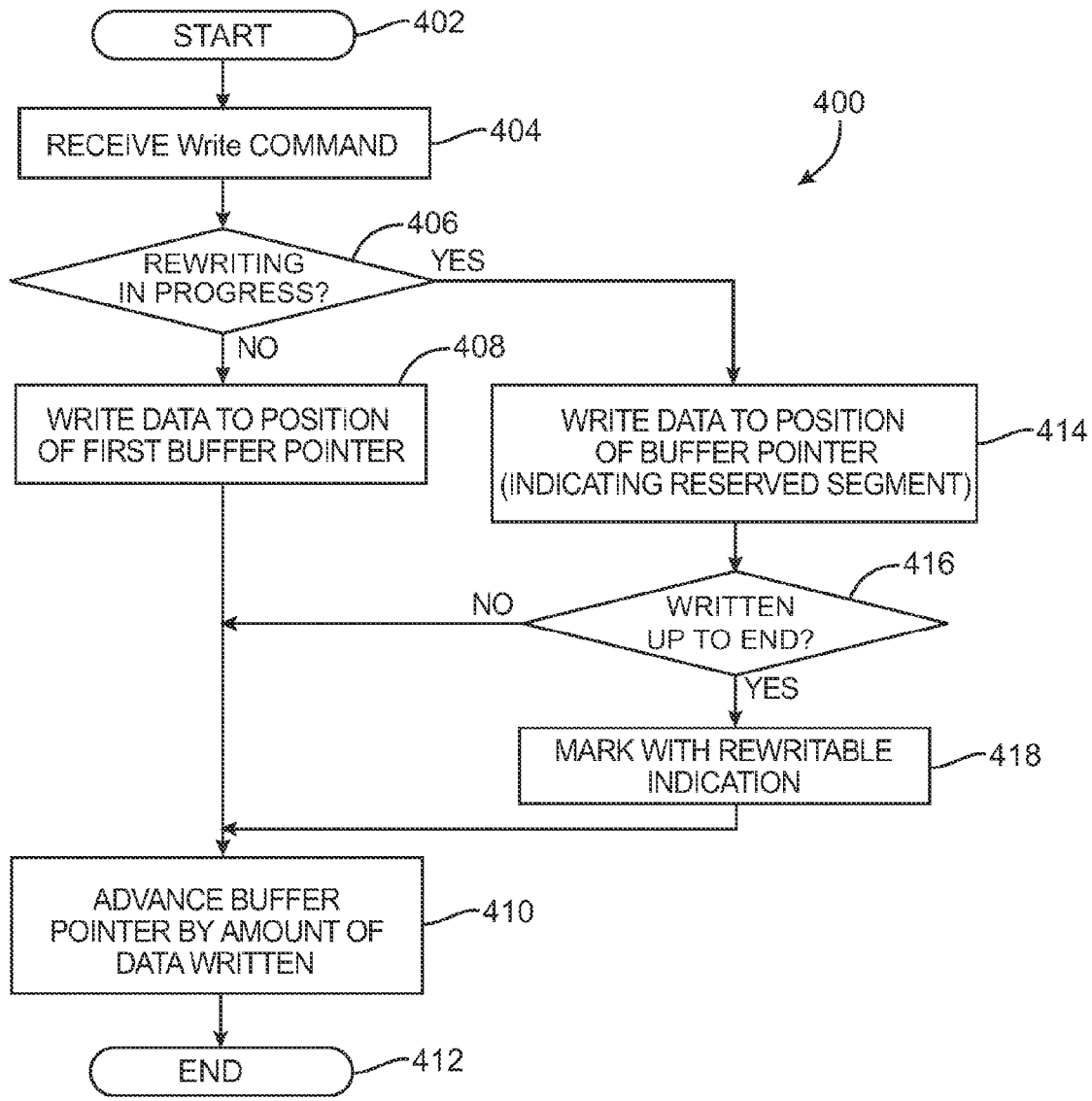
FIG. 14 is a flow diagram depicting a process of a controller when a Write command is received by the controller according to the alternative embodiment of the invented method.

FIG. 14 is a flow diagram showing a process 400 for receiving a Write command from the host 12, according to the alternative embodiment. The process 400 starts at start block 402. The controller 30 receives a Write command from the host 12 via the interface 14, in process block 404. In decision block 406, the controller 30 determines if rewriting is in progress. This determination can be implemented as previously discussed.

If it is determined that rewriting is not in progress, the controller 30 writes data to the position indicated by the buffer pointer in the buffer 16 in process block 408. The controller 30 then advances the buffer pointer by the amount of data written, in processes block 410. The process 400 then ends in end block 412.

Returning to decision block 406, if it is determined that rewriting is in progress, the controller 30 writes data to the position indicated by the buffer pointer, a reserved segment S7, in process block 414. It is determined, in decision block 416, if the data written to the segment S7 is at or near capacity of the segment. If the data has not consumed the capacity of the segment S7, the buffer pointer is advanced by the amount of data written, in process block 410. If it is determined that the data is at capacity of the segment S7, the reserved segment is marked with a rewritable indication, shown in process block 418. The rewritable indication may indicate that the data in the marked segment can be written together with the data set to be rewritten. The process 400 continues to process block 410 where the buffer pointer is advanced by the amount of data written and then ends in end block 412.

Upon receiving a Write FM command from the host 12, the controller 30 writes the data in the buffer 16 to the temporary recording area 42 and returns a status to the host 12, as previously discussed. If rewriting is in progress, the controller 30 waits for the data received from the host 12 to be rewritten to the normal recording area 44, and returns the status of the rewriting to the host 12. Thus, data sets D are written in the temporary recording area 42 and are then rewritten to the normal recording area 44 at a predetermined timing.

Figure 15:
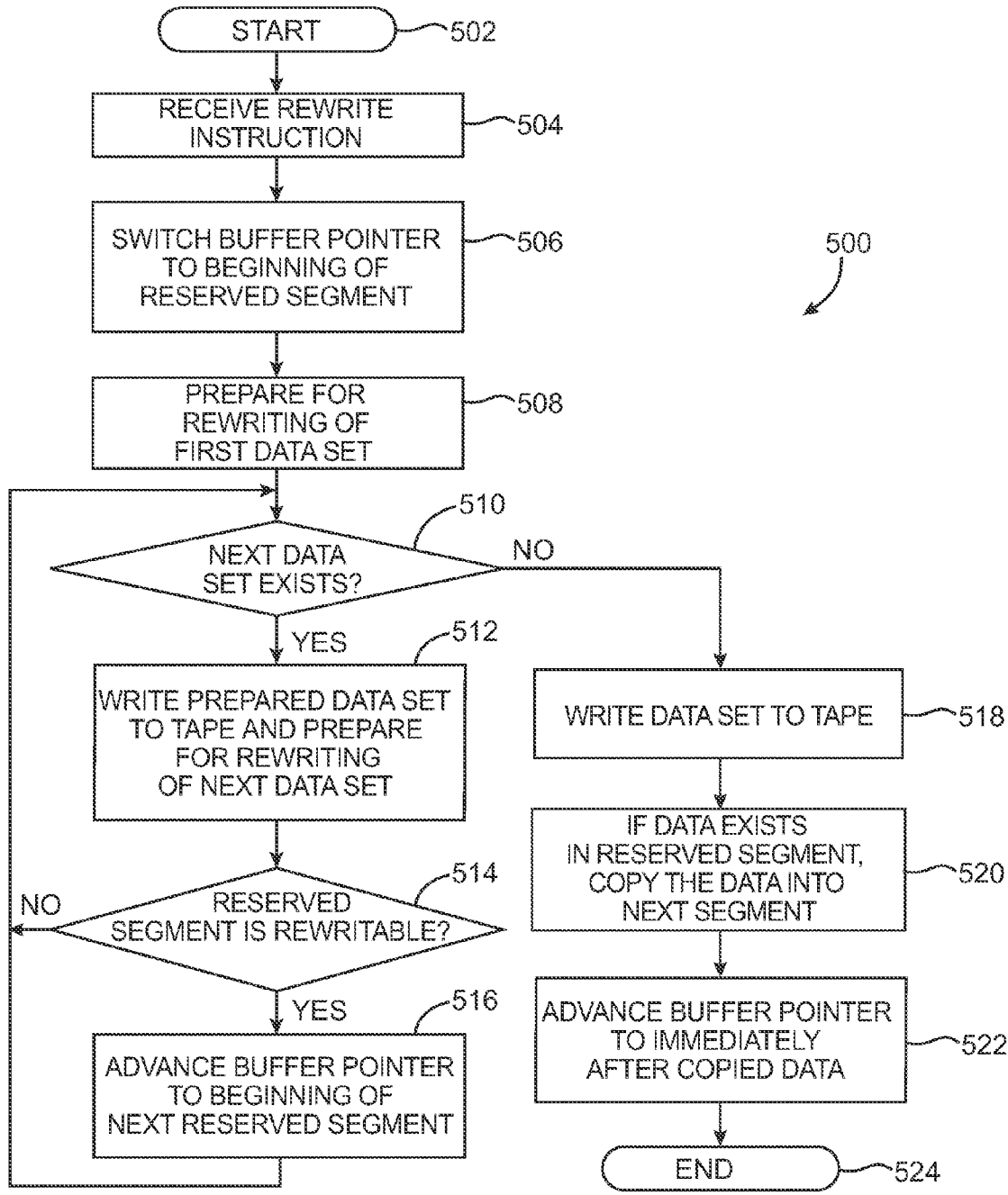
FIG. 15 is a flow diagram depicting a process of the controller when performing a rewriting process according to the alternative embodiment of the invented method.

FIG. 15 is a flow diagram showing a rewriting process 500 of the alternative embodiment. The rewriting process 500 begins in start block 502. The controller 30 receives an instruction to perform rewriting in process block 504. The instruction may be issued when the buffer 16 has no available storage space or when the temporary recording area 42 is fully consumed. The controller 30 switches the buffer pointer to the beginning of the reserved segment S7 in process block 506, since the buffer pointer may be used for both open segments and reserved segments.

In process block 508, the controller 30 prepares for rewriting of the data set D1 in the first segment S1, as previously discussed. The controller 30 determines if a next data set D2 exists in a next segment S, in decision block 510. The segment S to be subjected to the determination may include a reserved segment S7. If it is determined that the data set D in the next segment exists, the controller 30 writes the data set D1 in the first segment S1 to the normal recording area 44, while preparing for the rewriting of the data set D2 in the second segment S2, shown in process block 512.

In decision block 514, the controller 30 determines if the reserved segment S7 is rewritable. If the reserved segment S7 is not rewritable, the process 500 returns to decision block 510. If the reserved segment S7 is rewritable, the buffer pointer is advanced to the beginning of the next reserved segment S8, in process block 516, and the process 500 returns to decision block 510. In the example shown in FIG. 11 to FIG. 13, since data exists in segment S2, the controller 30 writes the data in the segment S1 to the normal recording area 44 and prepares the data D2 in the segment S2 for rewriting. The process 500 continues until it is determined that a data set D does not exist in the (N+1)th segment, and the controller 30 writes the data set in the Nth segment to the normal recording area 44, in process block 518.

If second data 46 stored in a reserved segment S7, the data 46 is sequentially copied into the segment subsequent to the last segment targeted for rewriting, shown in process block 520. The buffer pointer is advanced to immediately after the copied data, in process block 522. The process 500 then ends at end block 524.

Accordingly, if rewriting is not in progress when a synchronization request is issued, data is written to the temporary recording area of the tape and a synchronization response is returned to the host. Thereafter, the data is written to the normal recording area. If rewriting is in progress when a synchronization request is issued, the data is written to the normal recording area with the data being rewritten, and a synchronization response is returned to the host. Data is then written to the temporary recording area and then to the normal recording area according to the RABF operations. When a synchronization request is issued by the host 12, a report indicating if writing data to the tape 20 was successful may be sent to the host 12.

Although the controller 30 recognizes if rewriting is successful, the result is not instantly transmitted to the host 12, as discussed above. This may result in data being abnormally recorded on the normal recording area 44 of the tape 20.

Figure 16:
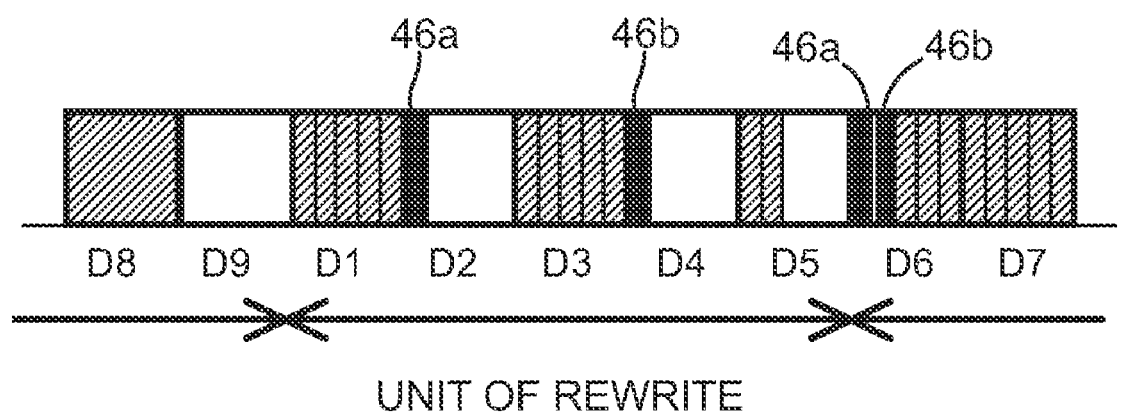
FIG. 16 is a schematic diagram showing an exemplary layout of a data set on a magnetic recording medium used for describing a Read process according to the alternative embodiment of the invented method.
Figure 17:
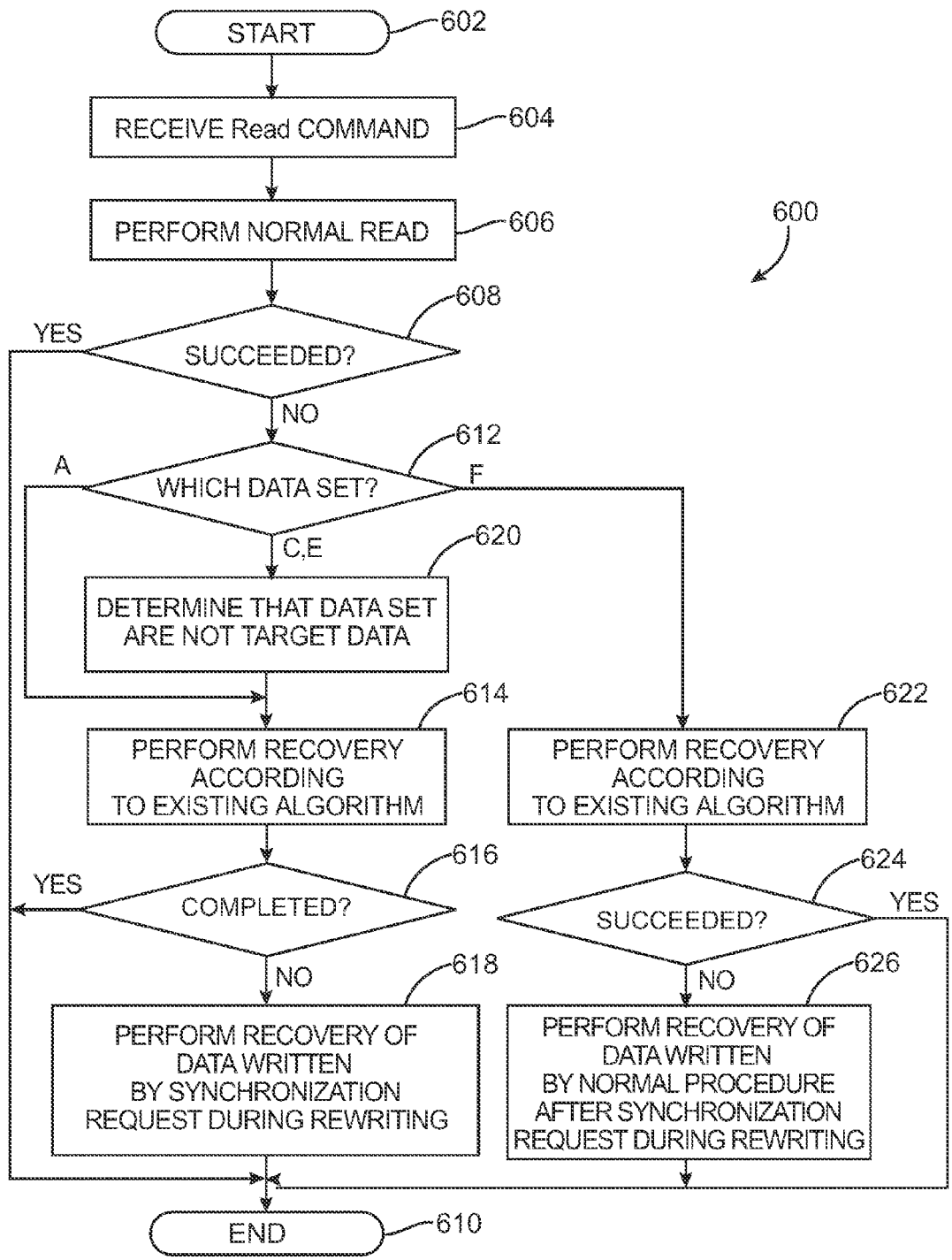
FIG. 17 is a flow diagram depicting a Read process performed by the controller according to the alternative embodiment of the invented method of the present invention.

Referring to FIG. 16 and FIG. 17 a read process 600, including recovering abnormally recorded data, is shown in the flow diagram. As shown in FIG. 16, each data set D may have a data set number and a write-pass number appended thereto (both not shown). The data set number is a sequential value indicating the order that the data is written and the read order of the data set D. A data set D written by synchronization and a normal data set are assigned the same data set number, so that a data set written by synchronization during rewriting can be skipped during reading, and are identified on the basis of the write-pass numbers. Data sets that contain second data 46 may have a flag indicating that the data set D was written by synchronization during rewriting.

The read process 600 commences in start block 602. In process block 604, the controller 30 receives a Read command from the host 12. In response to the Read command, the controller 30 reads the data from the tape 20 in process block 606. Data set D2 and data set D4, that contain second data 46, are written for synchronization only and may be skipped by reading to the data set numbers and the write-pass numbers.

In decision block 608, the controller 30 determines if the data 40 was read successfully. If the data was read successfully, the process 600 ends at end block 610. If the data was not successfully read, in decision block 612, the controller 30 determines the type of the data set that failed to be read. The determined type of data set may be a data set D1, where the data set is not subsequent to a data set written by synchronization during rewriting. This type of data set D1 is subjected to recovery according to an existing algorithm, shown in process block 614.

In decision block 616, the controller 30 determines if all the data to be sent to the host 12 has been transmitted. If it is determined that all that data has been transmitted, the process ends at end block 610. If it is determined that all the data has not been transmitted, the data written in the normal recording area 44 in response to the synchronization request during rewriting is recovered, in process block 618. That is, the second data 46 of data set D2 and data set D4 is read and transmitted to the host 12. Since the tape drive 10 writes the second data 46 to the normal recording area 44 and returns a synchronization success notification to the host 12, the drive 10 reads and returns such second data 46 in response to a read request from the host 12.

Returning to decision block 612, the type of data set may be a data set D3, D5 subsequent to a data set written by synchronization during rewriting. Although, the data sets D2, D4 that contain second data 46 are usually skipped during reading, if there is reading failure of data set D3 and data set D5, the data sets D2, D4 may be misread as data sets D3, D5. Thus, in process block 620, the controller 30 reads the flag that indicates that the data set was written by synchronization during rewriting and determines if the data sets being read are, or are not, the target data sets. The data 40 in data sets D3, D5 is then recovered according to the existing algorithm, in process block 614. The controller 30 then determines if all the data to be sent to the host 12 has been transmitted, in decision block 616, and the process 600 continues and discussed above.

Returning to decision block 612, the type of data set determined may be a data set D6 that includes the data written by RABF after the synchronization during, i.e. the data set D6 includes both second data 46 and normally recorded data 40. In process block 622, this data set D6 is subjected to recovery according to an existing algorithm.

In the algorithm, data 40 and second data 46 are read from the temporary recording area 42 and transmitted to the host 12. In particular, the second data 46 is checked to determine if the recovery of the data was successful in decision block 624. If the recovery was successful the process 600 ends in end block 610. If the recovery was not successful, in process block 626, recovery is performed using the second data 46 in a previous unit of rewriting.

Particularly, if reading a first second data 46a has failed, the second data 46a from data set D2 is read and transmitted. If reading a second second data 46b has failed, the second data 46b from data set D4 is read and transmitted.

In the present embodiment, data received during rewriting is stored in a reserved segment and written to the normal recording area, after which the data is copied into a segment that is not currently targeted for rewriting. Data received during rewriting may be stored in both the reserved segment and the segment not targeted for rewriting when the data is received.

Therefore, when a synchronization request arrives during rewriting, the data associated with the synchronization request is stored in a reserved segment, and is then written to the tape together with the data being rewritten. Thus, performance of RABF operations is improved.

If a time interval between synchronization requests sent from the host is long, the likelihood of a synchronization request being sent during rewriting is low. The system and method is particularly effective when the time interval between synchronization requests is short.

Since the data recorded for synchronization is not read, the data read rate is low. For example, in a case where 50 KB out of 400 KB is reserved as a reserved area, assuming that the rate for recording using the standard method is about 40 MB/s, the rate using the system and method is about 35 MB/s. The system and method can therefore be particularly effective when writing is more frequently carried out than reading and when the significance of data is high. For example, in a typical backup/restore application, generally, only a backup is performed while a restore is rarely performed. Thus, the problem of reduction in reading performance is not serious.

For the same reason, the capacity of the cartridge is reduced. However, as can be observed from the current usage of products, most applications frequently requesting synchronization use so-called mainframes as the host. Such applications often use the next cartridge without consuming the full capacity of the cartridge. In the present embodiment, therefore, the problem of reduction in cartridge capacity is not critical.

Further, RABF is not activated when the frequency of synchronization is low and any reduction in performance and reduction in cartridge capacity do not necessarily occur. In the present invention, therefore, while performance for write operations is improved, there is a possibility of occurrence of a capacity loss. This problem can be mitigated by using a technique for making the data set size variable (a technique that allows the data set size to become 1 to N times the original size in units of 1/N).

In the first embodiment, for example, 1/N of each segment is used as a reserved area. A data set to which the data by synchronization during rewriting is not added has a size of $(N-1)/N$, and a data set to which the data by synchronization during rewriting is added has a size of N/N. Thus, the reduction in capacity or the reduction in data rate at the read time can be mitigated. In the second embodiment, the size of a data set to be inserted (a data set stored in a reserved segment) may be slightly larger than the size of data for synchronization. Thus, similarly to those described above, the reduction in capacity or the reduction in data rate at the read time can be mitigated.

A model-based performance evaluation was carried out in the following manner. In the evaluation, the segment size (data set size) was 400 KB, the number of segments in the buffer was 1000, and the amount of data to be synchronized one time ranged 48 KB to 384 KB. Using the method of the first embodiment, given that the size of the reserved area was 50 KB, although a maximum capacity loss of 12.5% was found, a performance of 103% to 107% over that of the conventional RABF was observed. Using the method of the second embodiment, although a capacity loss of 24% to 17% was found, a performance of 102% to 113% over that of the conventional RABF was observed.

The present invention may be implemented in whole by hardware or may be implemented in whole by software. Alternatively, the present invention may be implemented by both hardware and software.

The present invention may also be implemented as a computer, a data processing system, or a computer program product. The computer program product can be stored in and provided through a computer-readable medium. The medium may be an electronic, magnetic, optical, electromagnetic, infrared, or semiconductor system (apparatus or device), or a transmission medium. As examples of the computer-readable medium, there are illustrated a semiconductor, a solid-state storage device, a magnetic tape, a removable computer diskette, a random access memory (RAM), a read-only memory (ROM), a rigid magnetic disk, and an optical disk. Examples of currently available optical disks include a compact disc read-only memory (CD-ROM), a compact disc read/write (CD-R/W), and a DVD.

Those skilled in the art will appreciate that various adaptations and modifications of the just-described preferred embodiments can be configured without departing from the scope and spirit of the invention. Therefore, it is to be understood that, within the scope of the appended claims, the invention may be practiced other than as specifically described herein.

What is claimed is:

1. A system for writing data to a magnetic tape comprising:
    a buffer for storing data, the buffer comprising a plurality of segments, each segment of the buffer comprising an open portion and a reserved portion, such that the open portion of a segment is larger than the reserved portion of the same segment; and
    a controller for controlling the storing data into the buffer, the controller controlling the storing of first data to an open portion of a segment of the buffer so that second data received when the first data is being written to the tape is stored in a reserved portion of a segment of the buffer.

2. The system of claim 1 wherein the data is written to a temporary recording area of the tape after the data is accumulated in one or more segments of the buffer, the temporary recording area used to write data while the tape is moving.

3. The system of claim 2 wherein the data is written to a normal recording area of the tape after the data is written to the temporary recording area.

4. The system of claim 2 wherein the controller outputs a write status when the data accumulated in the buffer is written to the temporary recording area.

5. The system of claim 1, wherein the controller copies the data received during data writing into a reserved portion of a segment of the buffer that is not accessed for writing the data.

6. A system for writing data to a magnetic tape comprising:
   a buffer for storing data, the buffer comprising a plurality of segments, each segment of the buffer comprising an open portion and a reserved portion, such that the open portion of a segment is larger than the reserved portion of the same segment; and
   a controller controlling the writing of data to the tape and the accumulation of data in the buffer, the controller first writing first data accumulated in at least one segment of the buffer to a temporary recording area on the tape and second writing of the first data to a normal recording area on the tape so that second data received during the second writing of the first data is written to the normal recording area as a portion of a target for the second writing of the first data.

7. The system of claim 6 wherein the temporary recording area on the tape is a portion of the tape used to write data while the tape is moving.

8. The system of claim 6 wherein the controller writes the second data to the normal recording area through a reserved portion of a predetermined segment of the buffer.

9. The system of claim 6 wherein the controller writes the second data to the normal recording area on the tape through a reserved segment of a plurality of segments comprising the buffer.

10. The system of claim 6 wherein the controller outputs a status of the first writing the first data at a predetermined time after the first writing and before the second writing of the first data.

11. The system of claim 6 wherein the controller reads the second data written in the normal recording area on the tape as the portion of the target for the second writing in response to a request for reading the second data.

12. A method for writing data to a magnetic tape comprising:
    writing first data accumulated in a buffer to a temporary recording area on the tape, the buffer comprising a plurality of segments, with each segment comprising an open portion and a reserved portion, such that the open portion of a segment is larger than the reserved portion; and
    upon receiving second data when writing the first data to a normal recording area on the tape, writing the second data to the normal recording area so that the second data is included in a same unit of recording as the first data.

13. The method of claim 12 wherein the second data is written to the normal recording area through the reserved portion of a predetermined segment of the buffer.

14. The method of claim 12 wherein the second data is written to the normal recording area on the tape through a reserved segment of the plurality of segments comprising the buffer.

15. The method of claim 12 wherein a write status is output when the first data is written to the temporary recording area.

16. The method of claim 12 wherein the second data is written to the normal recording area by a procedure similar to a procedure used when the second data is received after the first data is written to the normal recording area.

17. The method of claim 12 wherein the second data written in the normal recording area on the tape is read in response to a request for reading the second data.

* * * * *